Aug. 2, 1960 G. F. SIMONS 2,947,914

ELECTRONIC APPARATUS

Filed Sept. 8, 1958 3 Sheets-Sheet 1

INVENTOR

GERALD F. SIMONS,

BY Felix A. Russell

ATTORNEY

PHONO AMPLIFIER

AUDIO AMPLIFIER

INVENTOR
GERALD F. SIMONS,
BY Felix A. Russell
ATTORNEY

Aug. 2, 1960 G. F. SIMONS 2,947,914
ELECTRONIC APPARATUS
Filed Sept. 8, 1958
3 Sheets-Sheet 3
FIG. 9
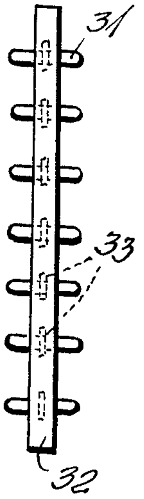
FIG. 6
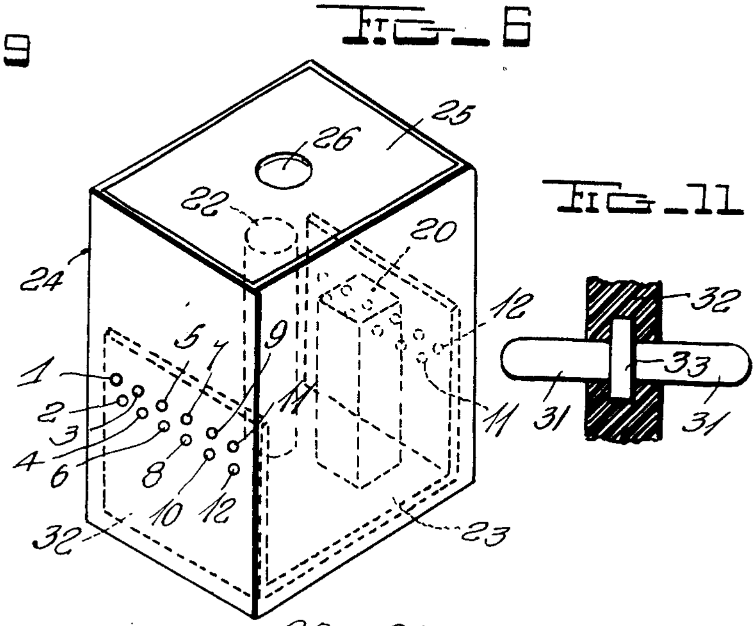
FIG. 11
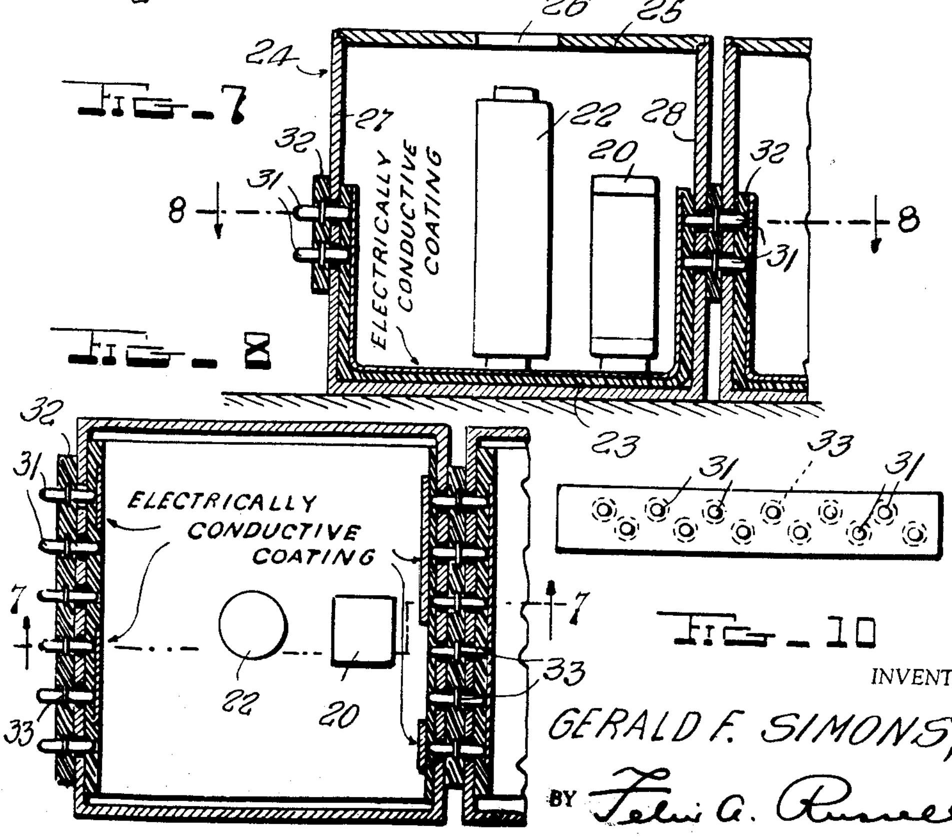
FIG. 7, FIG. 8, FIG. 10
INVENTOR
GERALD F. SIMONS,
BY Felix A. Russell
ATTORNEY 2,947,914
Patented Aug. 2, 1960

1

2,947,914

ELECTRONIC APPARATUS

Gerald F. Simons, Joplin, Mo., assignor to Pacific Mercury Television Mfg. Corp., Joplin, Mo., a corporation of California Filed Sept. 8, 1958, Ser. No. 759,647

4 Claims. (Cl. 317—101)

The present invention relates to electronic apparatus which is composed of a plurality of building-block type units whereby various types of assembled units may be formed by the selection of appropriate dimensionally interchangeable units.

An object of the invention is to provide a group of individual units all of identical outside dimensions or multiples thereof and which may be quickly assembled in any desired combination to form a radio receiver, an audio amplifier, an intercommunication system and similar assemblies.

It is a feature of the invention that the user may select a particular group of component units and assemble them quickly and conveniently by means of appropriate interconnecting plugs. By changing or adding component units, the type of the completed apparatus may be readily changed. Moreover, individual units may be readily replaced for maintenance and repair purposes.

Additional objects, features and advantages of the invention will become apparent upon reading the following specification together with the accompanying drawings forming a part hereof.

Referring to the drawings:

Figure 7 is a sectional view in elevation showing two typical units interconnected with each other.

Figure 8 is a plan sectional view taken along line 8—8 of Figure 7.

Figure 9 is a plan view of one of the interconnecting plugs.

Figure 10 is an end elevational view of the plug shown in Figure 9.

Figure 11 is an enlarged fragmentary sectional view through the plug of Figure 9 showing one of the double-ended prongs.

Figure 1:
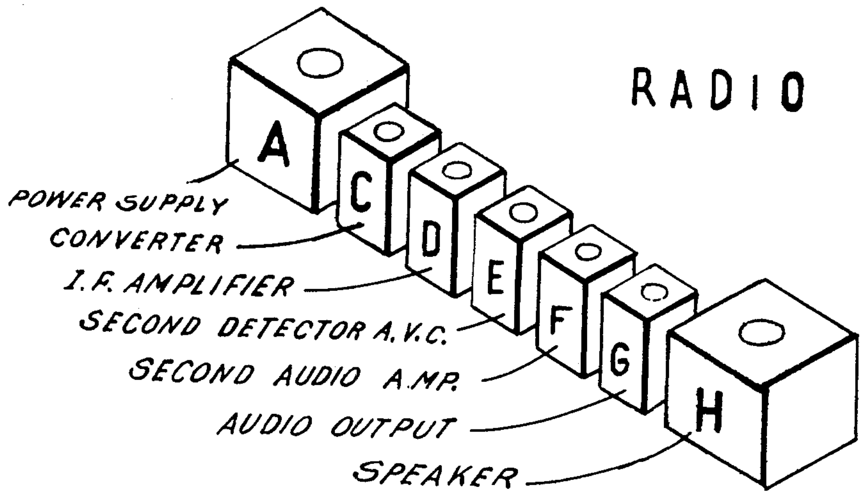
Figure 1 is a diagrammatic perspective view which illustrates a group of units so selected that, when assembled together by suitable interconnecting plugs, they will provide a radio receiver of the superheterodyne type.

Referring to Figure 1, there is shown a group of end units designated A and H with a series of intermediate units C, D, E, F and G interposed between them. The end units are of the same size and intermediate units, all of which are smaller than the end units, are also of the same size. A pleasing appearance is thus obtained.

The end unit A is a power supply of conventional character providing anode and biasing voltages. The end unit H is a conventional loudspeaker.

2

Intermediate unit C is a conventional converter stage for use in a superheterodyne receiver and includes the tuning facilities for the antenna and beat frequency oscillator.

Intermediate unit D is a conventional intermediate frequency amplifier which may provide one or more stages of amplification.

Intermediate unit E is a conventional second detector which also includes means for deriving the usual automatic volume control potential which varies the gain of units C and D.

Intermediate unit F is an audio frequency amplifier of conventional circuitry.

Intermediate unit G is an audio output amplifier of conventional circuitry which provides sufficient peak power for operation of the loudspeaker unit H.

Figure 2:
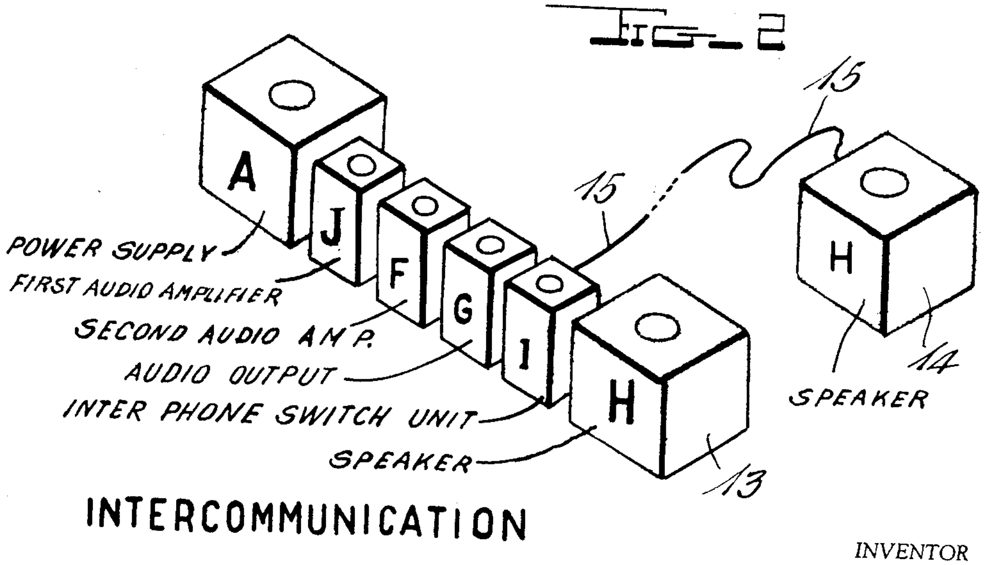
Figure 2 is a similar view to Figure 1 showing a group of units selected to provide a two station intercommunication system.

Figure 2 shows a two-station intercommunication system which comprises end units, the end unit H being designated 13, as described above. A second loudspeaker unit H designated 14 is disposed at a location remote from the first loudspeaker unit 13 and is connected to a switching unit I by a suitable circuit 15. The switching unit I has a conventional circuitry for connecting one or the other of the loudspeaker units 13 or 14 to the input of a first audio amplifier unit J and simultaneously connecting one of the other of the loudspeaker units 13 or 14 to the output amplifier unit G so that the loudspeaker unit which is connected to unit J operates as a microphone and the other is connected to unit G for operation as a loudspeaker. The first amplifier unit J is of conventional circuitry.

Figure 3:
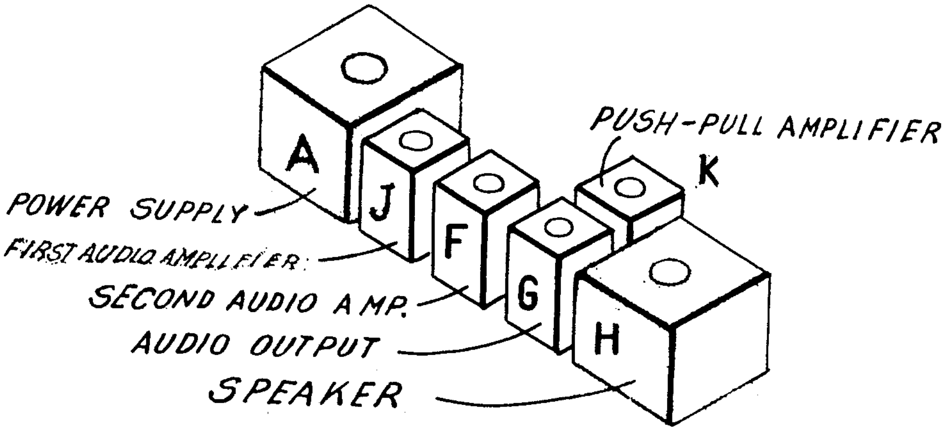
Figure 3 shows a group of units selected to provide an audio amplifier suitable for use with phonograph pickup or with a public address system.

Figure 3 shows a phonograph or public address amplifier consisting of end units A and H and intermediate units J, F and G, all previously described. The phonograph pick-up or microphone, as the case may be, is connected to the first audio amplifier unit J. Because of the high energy levels involved and to avoid distortion arising from the presence of even harmonics, a push-pull amplifier unit K is interposed between the output amplifier unit G and the loudspeaker unit H.

Figures 4, 5:
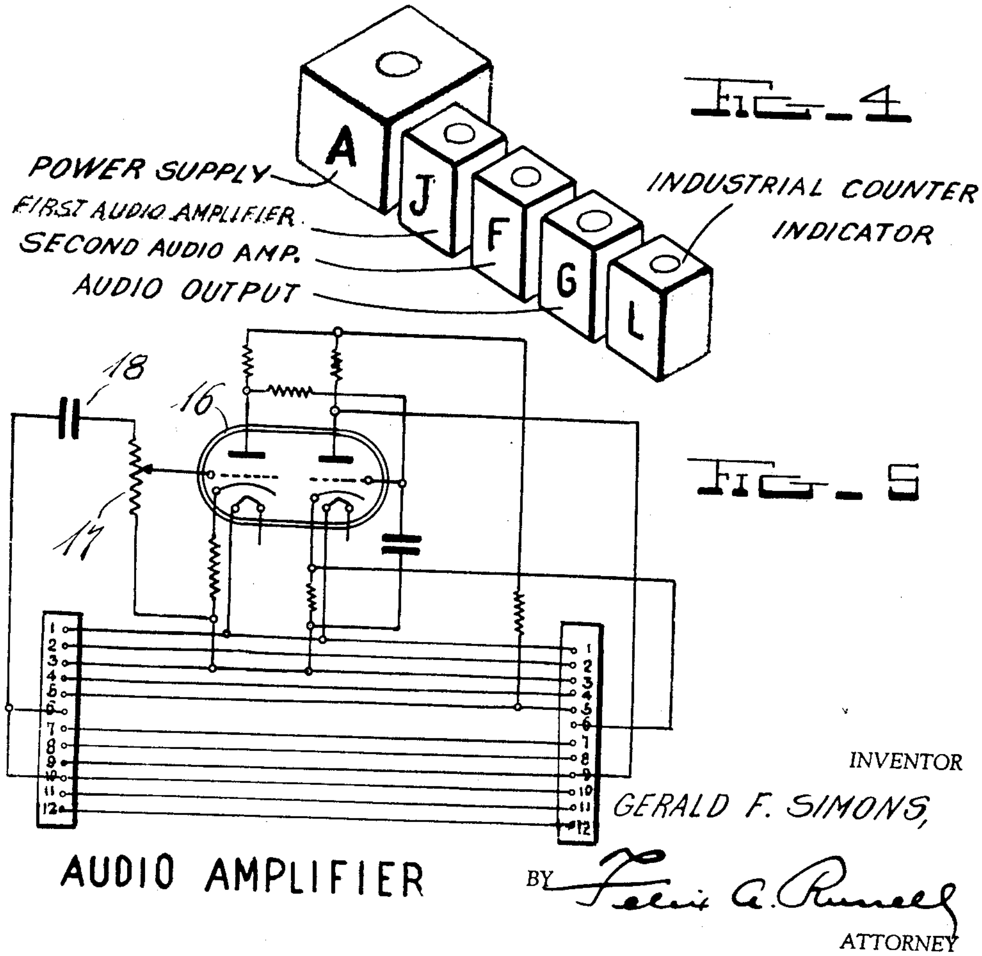
Figure 4 shows a group of units selected to provide a counter for industrial use, the counter being actuated by photoelectric means or by delicate contacts.
Figure 5 is a circuit diagram of a typical unit which illustratively shows a two-stage resistance coupled amplifier.

Figure 4 shows an arrangement of units for use as a counter. The first amplifier unit J is connected to some suitable device which is responsive to a series of objects or otherwise provides impulses to be counted. The loudspeaker unit H has been replaced by a counter unit L of conventional internal construction which is responsive to impulses received from the output amplifier G and which gives a suitable indication of the total count.

Figure 5 illustrates the circuitry for the first audio amplifier unit J. A twin triode 16 is shown connected as a two-stage resistance coupled amplifier. The amplifier input includes a volume control 17 and a coupling capacitor 18. The input is connected to left jack terminals 6 and 10, in multiple. Jack terminal 6 at the right is connected to the low impedance or cathode follower amplifier output to be passed on to the next unit located at the right of unit J, such as unit F in Figs. 2, 3 and 4. Jack terminal 10 is connected through from left to right, thus making the amplifier input accessible from a unit located at the right, such as switch unit I of Fig. 2.

Heater current supply voltage is connected through between jack terminals 1 and 2. Terminal 3 is ground and is connected through. Terminals 4 are connected through, unused in Fig. 5. Terminals 5, which are connected through, provide anode voltage derived from unit A. The high impedance or anode output of the amplifier is connected to jack terminals 9 which are through-connected. Through-connected jack terminals 7, 8, 11 and 12 are not used in Fig. 5, but may be assigned to the automatic volume control voltage or some other desired circuit to provide proper flexibility for the assembly of basic units in any desired combination.

Figure 6 shows the general arrangement of a typical unit such as the intermediate frequency amplifier unit D of Fig. 1. The unit comprises a tuned intermediate frequency transformer unit 20 and an amplifier tube enclosed in a shield 22. Although two intermediate frequency transformers may be used, only one has been shown in the drawing. The apparatus is mounted on a printed circuit board 23 which is bent up at its ends so that the jack terminals 1—12 of one unit will confront the corresponding jack terminals of an adjacent unit at either side. The apparatus is enclosed in a rectangular housing designated generally as 24. The top wall 25 of housing 24 is apertured at 26 above the tube shield 22 for ventilation purposes to dissipate the heat from the tube within the shield 22. The jack terminals 1—12 are accessible through suitable apertures formed in the end walls 27 and 28 of the housing 24.

Figures 9 to 11 show the multi-conductor plug which is used for interconnecting two adjacent units. A series of double-ended prongs 31 are mounted in a flat plate member 32 formed of suitable insulating material. Each prong is provided intermediate its ends with a collar 33 which is preferably integrally formed with the prong 31. The collar 33 holds the prong 31 against longitudinal movement. Advantageously, the prongs 31 may be assembled as inserts during a molding operation for the formation of the insulating plate 32.

While I have described what I believe to be the best embodiments of my invention, it will be apparent to those skilled in the art that various modifications may be made therein without departing from the spirit and scope of the invention as defined in the appended claims.

What is claimed is:

1. An electrical apparatus comprising two adjacent housings having parallel confronting adjacent end walls, electrical circuit components in said housing, a printed circuit board in each housing on which said components are mounted, one end portion of each circuit board being adjacent to one of said end walls, a plurality of jack terminals on each of said end portions disposed in confronting relationship, and a plug comprising a plurality of double-ended prong members disposed intermediate said housings, each prong extending between and interconnecting two confronting ones of said jack terminals.

2. An electrical apparatus comprising a group of circuit units, each unit being enclosed in a housing having at least one wall which is disposed adjacent to and in spaced parallel confronting relationship with respect to a corresponding wall of another unit, a plurality of female jack terminals in each unit, each of said jack terminals being in alignment with and confronting a corresponding jack terminal of the adjacent unit, said adjacent walls being apertured for access to said jack terminals, a plurality of elongated parallel double-ended male prong members removably interconnecting confronting ones of said jack terminals, circuitry common to a plurality of said circuit units including connections formed by said prong members, and a separate circuit board disposed in each housing, the portion of said common circuitry which is disposed in a particular housing being at least in part printed on said circuit board, each circuit board comprising at least one end portion which extends parallel to and in proximity to the apertures of said wall, said jack terminals being mounted on said end portion of said circuit board, said circuit board further comprising a second portion which is connected to and extends perpendicularly away from said end portion, said portion of said common circuitry extending over both said end portion and said second portion.

3. An apparatus according to claim 2, further comprising a common insulating and supporting member for all of said prong members, whereby said prong members and said supporting member together form a multi-conductor plug.

4. Apparatus according to claim 2 wherein one of said circuit units is an amplifier having an input and an output, said input and output being connected to jack terminals at opposite sides of said housing for connection to an adjacent circuit unit located at either side of the housing for said amplifier circuit.

References Cited in the file of this patent

UNITED STATES PATENTS

| | | |
|---|---|---|
| 2,762,987 | Mackey | Sept. 11, 1956 |
| 2,876,277 | Badger | Mar. 3, 1959 |

OTHER REFERENCES

Radio-Craft for January 1939 (a publication), pages 400, 401 and 431.